Sept. 1, 1942.   C. M. HINES   2,294,602
BRAKE CONTROL SYSTEM
Original Filed March 29, 1941
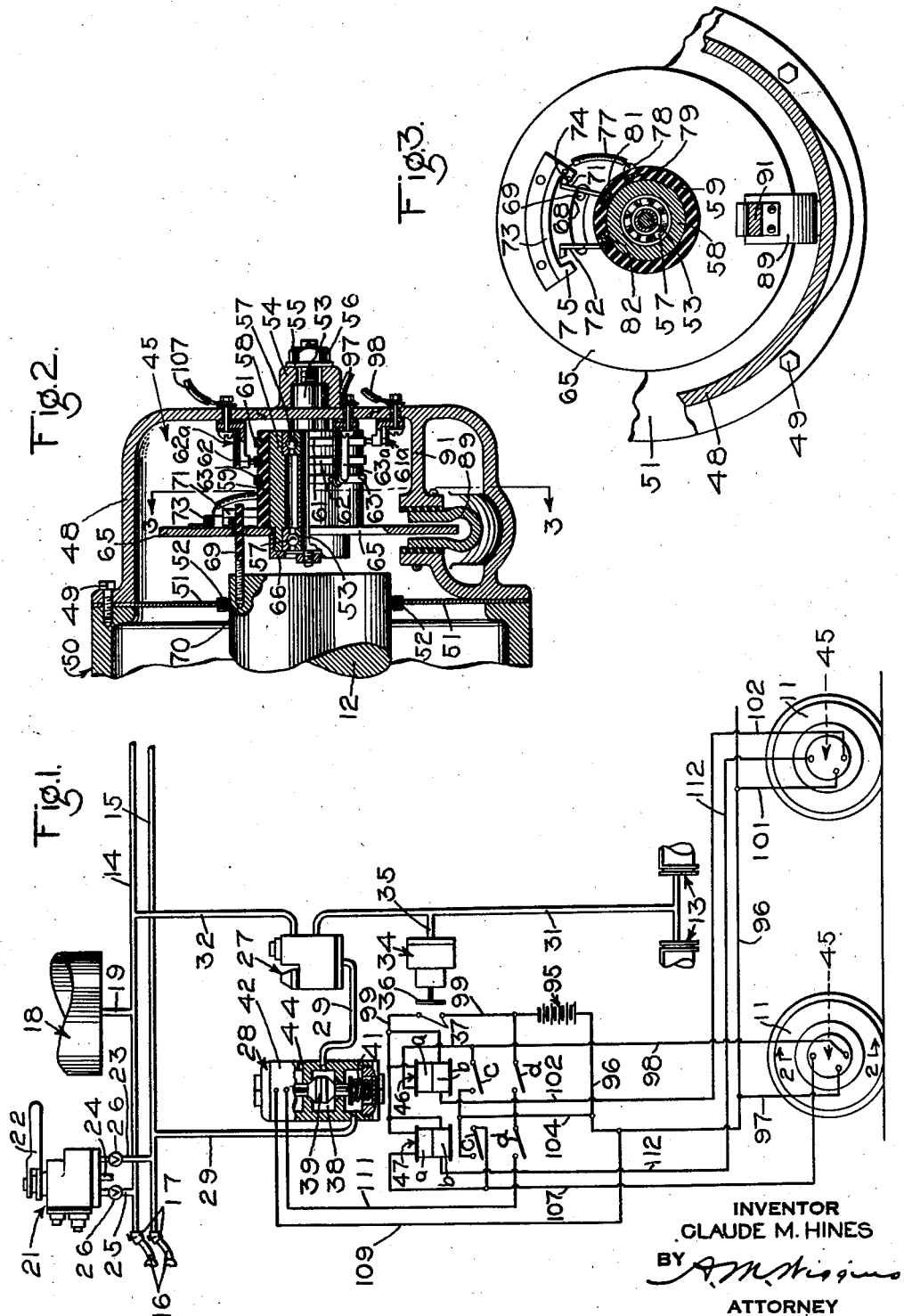
INVENTOR
CLAUDE M. HINES
BY
ATTORNEY Patented Sept. 1, 1942

2,294,602

UNITED STATES PATENT OFFICE 2,294,602

BRAKE CONTROL SYSTEM

Claude M. Hines, Pittsburgh, Pa., assignor to The Westinghouse Air Brake Company, Wilmerding, Pa., a corporation of Pennsylvania Original application March 29, 1941, Serial No. 385,887. Divided and this application June 28, 1941, Serial No. 400,157

11 Claims. (Cl. 303—21)

This invention relates to brake control systems for vehicles, such as railway cars and trains, which systems are of the type having means for automatically releasing the brakes associated with the wheels in response to the slipping of the wheels to prevent the sliding thereof, the present application being a division of my prior application Serial No. 385,887, filed March 29, 1941, and assigned to the assignee of the present application.

As is well known, the application of the brakes on a vehicle wheel to a degree sufficient to exceed the limit of rolling friction or adhesion between the wheel and the road surface or rail causes the wheel to decelerate rapidly to a locked or non-rotative condition and slide.

In describing my present invention, I employ the term "slide" or "sliding condition" to designate the locked or non-rotative condition of the wheel in which it is dragged along the rail. As distinct from the term "slide" I employ the term "slip" or "slipping condition" to designate the rotation of a vehicle wheel at a speed greater or less than a rotative speed corresponding to the speed of travel of the vehicle at a given instant, whether the wheel is momentarily decelerating or accelerating.

It is desirable to prevent a vehicle wheel, particularly to a railway car wheel, from sliding because the sliding of the wheel develops flat spots on the wheel, necessitating replacement or repair of the wheels.

Various types of automatic brake control devices have heretofore been devised for the purpose of preventing the sliding of vehicle or car wheels. One type of such automatic brake control device comprises a wheel-slip detecting device of the so-called rotary inertia type having a fly-wheel, of relatively heavy mass, driven through a resilient connection by a shaft that rotates in accordance with the speed of rotation of a vehicle wheel or wheel-and-axle assembly. The degree of rotational shift of the fly-wheel with respect to the driving shaft is proportional to the rate of deceleration or acceleration of the driving shaft. Suitable switch means is provided which is operated in response to a rotative displacement of the fly-wheel exceeding a certain amount and corresponding to a rate of deceleration exceeding a certain rate which is attained only when the wheel slips.

A brake control equipment of this type is disclosed in Patent 2,198,033 of C. C. Farmer. In this patent, the rotary inertia device is contained in a casing constituting an extension of the journal housing at the end of a wheel axle and a suitable coupling is provided between the end of the axle and the driving shaft of the rotary inertia device.

It has been found, however, that the shock and jar incident to operation of a car along a track causes fretting corrosion of the bearings supporting the fly-wheel on its driving shaft, which corrosion interferes with the accuracy and sensitivity of the device.

I have accordingly devised a novel device, which is fully described and claimed in my parent application Serial No. 385,887, referred to above, which device is free from the objectionable characteristics of heretofore-known devices.

Briefly, this novel wheel-slip detecting device comprises a rotary disk of non-magnetic conducting material which is driven in accordance with the speed of rotation of a wheel unit through a loose connection permitting a limited amount of rotative movement of the rotary member with respect to the wheel unit, and eddy current brake means adapted to exert a braking effect on the disk to cause it to shift to one or the other of two opposite extremities of movement with respect to the wheel unit depending upon the direction of rotation of the wheel unit, thereby automatically serving as a means for detecting the direction of rotation of the wheel unit. The braking effect exerted on the rotary disk by the eddy current braking means is such that the rate of rotative deceleration of the wheel unit begins to slip, in which case the rotary disk is decelerated at a lesser rate than the wheel unit and thus shifts from the one extremity of movement with respect to the wheel unit, in which it is positioned normally according to the direction of rotation of the wheel unit, to the opposite extremity of movement thereof with respect to the wheel unit.

It is an object of my present invention to provide suitable apparatus adapted to function in connection with the wheel-slip detecting device of my parent application Serial No. 385,887 for the purpose of causing an automatic release of the brakes associated with a slipping wheel.

It is a further object of my present invention to provide apparatus of the type indicated in the foregoing object and further characterized by means for insuring a continued reduction in the degree of application of the brakes to below a certain degree, once a wheel begins to slip and independently of subsequent variation in the condition of the slipping wheel, before permitting reapplication of the brakes on the slipping wheel.

The above objects, and other objects of my invention which will be made apparent hereinafter, are attained in an illustrative brake control equipment subsequently to be described and shown in the accompanying drawing, wherein Fig. 1 is a simplified diagrammatic view showing a fluid pressure brake equipment for the wheels of a four-wheel car truck and including the wheel-slip detecting device and associated control apparatus of my invention, Fig. 2 is an enlarged fragmental vertical sectional view taken substantially on the line 2—2 of Fig. 1, showing details of the wheel-slip detecting device included in my invention, and Fig. 3 is a fragmental sectional view, taken on the line 3—3 of Fig. 2, showing further details of construction.

*Description*

Referring to Fig. 1 of the drawing, the brake control equipment shown therein is limited to a single four-wheel car truck having two wheel-and-axle assemblies carried in a truck frame (not shown) of conventional design. In the drawing, only one wheel 11 of each wheel-and-axle assembly of the car truck is shown, it being understood that each of the wheels shown is fixed at one end of an axle 12, to the opposite end of which a similar wheel (not shown) is fixed.

The brakes associated with the wheels 11 may be of any suitable type, such as the conventional clasp shoe type adapted to be applied and released through conventional brake levers and brake rigging in response to the supply of fluid under pressure to and the release of fluid under pressure from one or more brake cylinders 13, two brake cylinders being shown for purposes of illustration. For simplicity, the brake shoes and the brake rigging are omitted from the drawing.

Fluid under pressure is supplied to the brake cylinders and released therefrom under the control of the operator of the car or train, by any suitable well-known type of pneumatic brake control equipment, either of the automatic or straight-air type. For purposes of illustration, I have indicated a simplified type of brake control equipment which is of the straight-air type, but it will be understood that the particular type of operator-controlled equipment is immaterial for the purposes of my invention.

As shown, the brake control equipment includes two train pipes 14 and 15, the sections of which on each car are connected through hose couplings 16 between successive cars in conventional manner. Conventional angle cocks 17 at opposite ends of the car sections of train pipes 14 and 15 may also be provided. The pipe 14, hereinafter referred to as the supply pipe, is constantly charged to the pressure in a reservoir 18, hereinafter referred to as the main reservoir, through a branch pipe 19.

The fluid pressure in the pipe 15, hereinafter referred to as the control pipe, is varied in accordance with the desired degree of brake application as by a manually operative brake valve device 21 of the self-lapping type.

The brake valve device 21 is of well-known construction and will therefore be only functionally described. Brake valve 21 comprises an operating handle 22 effective upon rotary movement in a horizontal plane to correspondingly shift a rotary operating shaft controlling the operation of suitable supply and release valves. With the brake valve handle 22 in its normal or brake release position, fluid under pressure is released from the control pipe 15 to atmosphere by way of a branch pipe 23, connecting the control pipe to the brake valve device, and an exhaust port and pipe 24. When the brake valve handle 22 is shifted out of its brake release position into a so-called application zone, fluid under pressure is supplied from the supply pipe 14 to the control pipe 15 by way of a branch pipe 25, connecting the supply pipe to the brake valve device, and thence through the pipe 23 to the control pipe 15.

The character of the brake valve 21 is such that the pressure of the fluid established in the control pipe 15 is substantially proportional to the degree of displacement of the brake valve handle 22 out of its brake release position. If the pressure in the control pipe tends to reduce for some reason, such as leakage, fluid under pressure is automatically supplied to maintain the pressure therein at a value corresponding to the position of the brake valve handle. This pressure-maintaining feature will be referred to hereinafter.

The branch pipes 23 and 25 connecting the control pipe 15 and supply pipe 14 to the brake valve device 21 have suitable manually controlled valves 26 therein. These valves may be of any suitable type and are normally in open position when it is desired to control the pressure in the control pipe 15 by means of the brake valve device 21 shown. If it is desired to control the pressure in the control pipe 15 by means of a brake valve device, similar to the brake valve 21 located on another car in a train, the valves 26 may be operated to closed position thus cutting the brake valve device 21 shown in Fig. 1 out of operation.

The brake control equipment further comprises a super-sensitive high-capacity relay valve device 27, preferably of the type described and claimed in Patent No. 2,096,491 of E. E. Hewitt, and a magnet valve device 28 for controlling communication through a branch pipe 29 connecting the control pipe 15 and the control chamber of the relay valve device 27.

Since reference may be had to the above-mentioned patent for details of construction and operation of the relay valve device 27, the relay valve device will be only functionally described herein.

The pressure of the fluid supplied from the control pipe 15 through the branch pipe 29 to the control chamber of the relay valve device 27 is effective to operate the relay valve to supply fluid at a corresponding pressure, or any desired ratio of pressure to that established in the control pipe, to the brake cylinders 13 through a brake cylinder pipe 31 from a branch pipe 32 of the supply pipe 14. It will be understood that the relay valve device 27 is of the self-lapping type so that the supply of fluid under pressure to the brake cylinders is automatically lapped or cut-off when the pressure in the brake cylinders corresponds to, or is a selected ratio to, the pressure in the control pipe 15 and supplied to the control chamber of relay valve device 27.

A pressure-responsive switch device 34, preferably of the type shown in Patent 2,095,492 to E. E. Hewitt, is connected to the brake cylinder pipe 31 by a branch pipe 35 and is operated in response to variations of brake cylinder pressure. As diagrammatically shown, the pressure switch 34 comprises a movable contact element 36 having an associated pair of fixed insulated contacts 37. When the pressure in the brake cylinders 13 exceeds a certain pressure, such as five pounds per square inch, the contact element 36 is snapped into engagement with the contacts 37 and is maintained in engagement therewith as long as such certain pressure is exceeded. When the pressure in the brake cylinders 13 reduces below five pounds per square inch, the contact element 36 is snapped out of engagement with the associated pair of contacts 37.

The magnet valve device 28 is of standard construction and comprises a casing having a chamber 38 formed therein in which is contained a double-beat valve 39, the valve 39 being biased by a coil spring 41 into an upper seated position and operated against the force of the spring 41 by energization of an electromagnet or magnet winding 42 to its lower seated position.

In its upper seated position, the double-beat valve 39 establishes communication between the two sections of the branch pipe 29 thereby permitting fluid under pressure to be supplied from the control pipe 15 to the control chamber of the relay valve device 27 and released therefrom in accordance with the variations of pressure in the control pipe 15.

In its lower seated position, the double-beat valve 39 cuts off communication between the two sections of the branch pipe 29 and establishes a communication through which the section of the branch pipe 29 connected to the relay valve device 27 is exhausted to atmosphere through a relatively large-sized port 44, thus reducing the pressure in the control chamber of the relay valve device 27 independently of the pressure in the control pipe 15.

As will be explained in greater detail hereinafter, the magnet winding 42 of the magnet valve device 28 is normally deenergized, thereby permitting the control of the brakes by the operator through variations of the pressure in the control pipe 15. Energization of the magnet winding 42 of the magnet valve 28 to effect release of the brakes independently of the pressure in the control pipe 15 is effected by apparatus including one or more wheel-slip detecting devices 45, constructed and operating according to my invention, and a pair of relays 46 and 47.

Referring to Figs. 2 and 3, a wheel-slip detecting device 45 is associated with each wheel-and-axle assembly of a car truck. Each device 45 comprises a casing 48 which is attached, as by a plurality of screws or bolts 49, to the open end of the axle journal 50 in place of the usual end cover. In this connection it should be understood that while I have shown a particular manner of installation of the wheel-slip detecting devices 45 at the end of an axle journal, any other suitable manner of mounting these devices may be employed.

In order to separate the working parts of the wheel-slip detecting devices from the interior of the axle journal in a maner to prevent possible entrance of oil, grease, dirt or other foreign particles which might interfere with the proper operation of the devices, a suitable guard may be provided, which may take the form of an annular member 51 of rigid construction having a suitable annular sealing ring 52 of felt or rubber or other suitable material for engaging the outer surface of the axle 12, the member 51 being secured in position between the casing 48 and the end of the axle journal 50.

On the outside central portion of the casing 48 is a protruding boss 54 having a recess on the interior thereof for receiving a spindle or stud bolt 53, the outer threaded end of which extends through an opening in the boss and is provided with a suitable lock washer 55 and nut 56 for securing the spindle to the casing. The location of the boss 54 is such that the spindle 56 is in coaxial alignment with the axle 12.

Rotatably mounted on the spindle 53, as by ball-bearings 57 at opposite ends thereof, is a tubular member or sleeve 58 having secured on the outside thereof a sleeve 59 of insulating material in which are disposed in side-by-side spaced relation three collector rings 61, 62 and 63.

Secured to the tubular member 58 at the inner end thereof adjacent the outer end of the axle 12 is a relatively thin disk 65 of non-magnetic sheet material, such as brass or aluminum. The tubular member 58 is threaded at the inner end thereof and a nut 66 is screwed thereon to secure the disk 65 to the tubular member 58.

The disk 65 is adapted to be rotatively driven by the axle 12 through a loose connection which, as illustrated, may take the form of an arcuate slot or opening 68, at a radial point between the axis and the peripheral edge of the disk, through which extends a pin 69 of insulating material which is secured to the axle 12 as by screwing tightly into a suitably tapped hole 70 in the end of the axle 12.

The insulating sleeve 59 carries a pair of parallel and substantially radially extending flexible contact fingers 71 and 72, which contact fingers are connected by connectors 81 and 82, respectively, that are embedded within the insulating sleeve, to the collector rings 61 and 62 respectively.

The disk 65 carries, in insulated relation thereto, a contact member 73 of conducting material. The contact member 73 has projections formed at the opposite ends thereof which will hereinafter be referred to as contacts 74 and 75.

The contact member 73 is connected by a flexible wire 77 to a connector or terminal post 78 secured in the insulating sleeve 59 and connected by a connector 79, embedded in the sleeve, to the collector ring 63.

Associated respectively with each of the collector rings 61, 62 and 63 are brush devices 61a, 62a and 63a including holders suitably secured in insulated relation to the casing 48, each brush device being adapted to engage its corresponding collector ring. As shown, the brush devices are secured to the casing 48 by insulated bolts which form the terminal or binding posts for the connection of wires to the brush devices.

Associated with the disk 65 is a permanent magnet 89 of substantially U-shape, the magnet being suitably mounted in magnetically insulated relation to the casing 48, as by a rib 91 of the casing, in straddling relation to the peripheral portion of the disk.

Upon rotation of the disk between the legs of the permanent magnet 89, eddy currents are produced in the disk which, in familiar manner, set up a magnetic flux reacting with the magnetic flux of the permanent magnet in a manner to produce a drag or a retarding effect resisting rotation of the disk.

The retarding effect, resisting rotation of the disk 65, exerted by the magnet 89 varies with the speed of rotation of the disk due to the fact that the kinetic energy in the disk increases as the square of the rotational velocity whereas the drag or actual retarding force exerted magnetically on the disk increases only in direct proportion to the rotational velocity of the disk. This variable rate of retardation of the disk will be referred to hereinafter and explained in greater detail.

As will be seen in Fig. 2, the driving pin 69 extends through the arcuate slot 68 in the disk 65 and between the parallel-extending contact fingers 71 and 72, the position of the arcuate slot 68 with respect to the contact fingers 71 and 72 being such that due to the drag on the disk 65 produced by magnet 89, the pin 69 engages one or the other of the contact fingers 71 or 72, depending upon the direction of rotation of the axle 12 and shifts the contact fingers into contact with the associated contact 74 or 75. Thus, assuming that the axle 12 rotates in a clockwise direction in Fig. 3, the pin 69 engages the contact finger 71 and bends it into contact with the contact 74. If the axle 12 were rotating in a counterclockwise direction, the pin 69 would shift to the opposite extremity of the arcuate slot 68, engage the contact finger 72 and bend it into contact with the contact 75. In other words, contact fingers 71 and 72 are tensioned so as to disengage the associated contacts 74 and 75 and do not engage the contacts 74 and 75 unless the pin 69 is shifted to the corresponding extremity of the arcuate slot 68 in disk 65.

The magnet 89 is so designed as to produce a rate of retardation of the disk 65 which exceeds that of the axle as long as the wheels fixed on the axle do not slip. The rate of rotative deceleration of the wheels fixed on the axle 12 does not exceed a rate corresponding to a rate of retardation of the car or train of four or five miles per hour per second as long as the wheels do not slip. If the wheels slip, however, the wheels will attain rates of rotative deceleration greatly in excess of five miles per hour per second, attaining rates corresponding to a rate of retardation of a car or train as high as thirty or forty miles per hour per second. In any case, whenever slipping of the wheels occurs, a rate of rotative deceleration thereof corresponding to a retardation rate of the train of at least ten miles per hour per second is established so that rotative deceleration of the wheels at such rate is a positive indication of a slipping condition thereof.

The magnet 89 is so designed with respect to the disk 65, therefore, that it produces a rate of rotative deceleration of the disk, assuming rotation of the disk independently of the axle, at a rate exceeding ten miles per hour per second.

Thus, as long as the wheels do not slip, the magnet 89 causes the disk 65 to be rotatively decelerated more rapidly than the axle 12 and consequently disengagement of the contact finger 71 (or 72) from its associated contact 74 (or 75) does not occur.

If the wheels slip, however, the axle rotatively decelerates at a greater rate than the disk 65. Consequently the pin 69 shifts from the one extremity of the arcuate slot 68 to the opposite extremity and momentarily engages the contact finger 71 or 72 adjacent that end of the slot and shifts it into contact with the associated contact 74 or 75. Thus, as seen in Fig. 3, if the wheels slip, the pin 69 will shift in the left-hand direction from the right-hand extremity of the slot 68 to the left-hand extremity of the slot to engage the contact finger 72 and bend it into engagement with the contact 75.

As previously mentioned, the rate of deceleration produced by the magnet 89 on the disk 65, assuming free rotation of the disk 65 indepently of the axle 12, varies with the speed of rotation of the disk. The reason for such variation is that the retarding force produced on the disk by the magnet 89 increases directly in proportion to the rotational speed of the disk whereas the kinetic energy or momentum in the disk increases with the square of the rotative velocity of the disk. It will thus be seen that at the instant a wheel begins to slip, the rotative retardation rate of the disk 65 will be higher at the lower speeds than at the higher speeds. This is so because the percentage of the magnetically produced braking or retarding force relative to the inertia force or momentum of the disk is greater at the lower speeds than at the high speeds.

It may happen, therefore, that at low train speeds for example below twenty miles per hour, the rate of retardation on the disk 65 at the instant wheel slip occurs may correspond to a rate of retardation of the car of fifteen to twenty miles per hour per second whereas the rate of retardation of the disk produced by the magnet at higher speeds, such as in excess of sixty miles per hour, may only be a rate corresponding to a rate of retardation of the train of ten miles per hour per second.

Thus the wheel axle 12 will begin to shift rotatively backward with respect to the disk 65 at different rates of rotative deceleration of the disk depending upon the rotative speed of a wheel at the instant it begins to slip. In any case, however, the slipping condition of the wheels is practically instantaneously detected.

As will be presently described, I employ the retrogressive or backward rotative shift of the axle with respect to the disk 65 and the consequent operation of one or the other of the contact fingers 71 and 72 to control the relays 46 and 47 in a manner to cause energization of the magnet winding 42 of the magnet valve 28 so as to produce a rapid reduction of the pressure in the brake cylinders 13.

The relays 46 and 47 are identical in construction and are of the so-called neutral type. Each of the relays 46 and 47 is of conventional construction comprising a magnetic core, not shown, a pair of separate windings designated $a$ and $b$ respectively and an armature effective, when picked-up to operate a pair of front contacts $c$ and $d$ from their respective normally open positions to closed positions.

Either of the windings $a$ or $b$ of each of the relays 46 and 47 is effective when energized to cause pick-up of the armature and closing of the front contacts thereof.

The arrangement of the contact fingers 71 and 72 of the wheel-slip detecting device 45 associated with the left-hand wheel unit shown in Fig. 1 is such that the contact finger 71 controls energization of the upper winding $a$ of relay 46 whereas the contact finger 72 controls energization of the upper winding $a$ of the relay 67.

The arrangement of the contact fingers 71 and 72 of the wheel-slip detecting device 45 associated with the right-hand wheel unit shown in Fig. 1 is such that the contact finger 71 controls energization of the lower winding $b$ of the relay 46, whereas the contact finger 72 controls energization of the lower winding $b$ of the relay 47.

The various circuits for energizing the windings of the relays 46 and 47 under the control of the wheel-slip detecting devices 45 will be described hereinafter in detail in connection with an assumed operation of the brake equipment shown in Fig. 1.

*Operation*

Let it be assumed that the car or train having the wheel truck shown in Fig. 1 in traveling under propulsion power, that the main reservoir 18 is charged in conventional manner to the normal pressure carried therein, and that the brake valve handle 22 is in its brake release position so that the brakes are released.

If the operator desires to bring the car or train to a stop, he first shuts off the propulsion power and then shifts the brake valve handle 22 out of its brake release position into its application zone an amount corresponding to the desired degree of application of the brakes. The control pipe 15 is thus charged with fluid at a pressure corresponding to the position of the brake valve handle, for example fifty pounds per square inch.

Upon the charging of the control pipe 15 fluid at the pressure in the control pipe flows from the control pipe through the branch pipe 29 to the control chamber of the relay valve device 27. The relay valve device 27 accordingly operates, as previously described, to supply fluid under pressure from the supply pipe 14 and branch pipe 32 through the brake cylinder pipe 31 to the brake cylinders 13, the pressure established in the brake cylinder corresponding to, or having a desired ratio to, the pressure established in the control pipe 15. The brakes are accordingly applied on the two wheel units of the wheel truck shown in Fig. 1 to a degree corresponding to the fluid pressure established in the brake cylinders 13.

Whenever the pressure in the brake cylinders 13 exceeds a predetermined pressure, such as five pounds per square inch, the movable contact 36 of the pressure switch 34 is snapped into its closed position engaging its associated contacts 37.

The windings *a* and *b* of the relay 46 are thus simultaneously energized. The circuit for energizing the winding *a* of the relay 46 extends from the positive terminal of a suitable source of direct current, such as a storage battery 95 which may be the usual battery for supplying illumination current, by way of a wire hereinafter referred to as the positive battery wire 96, a branch wire 97, brush device 63a of the wheel-slip detecting device 45 associated with the left-hand wheel unit, collector ring 63, connector 79, terminal post 78, wire 77, contact 74, contact finger 71, connector 81, collector ring 61, brush device 61a, a wire 98, winding *a* of relay 46, and a wire 99 hereinafter referred to as the negative battery wire and including the contacts of the pressure switch 34, to the negative terminal of the battery 95.

The circuit for energizing the winding *b* of relay 46 extends from the positive terminal of the battery 95 through the positive battery wire 96, a branch wire 101, brush device 63a of the wheel-slip detecting device 45 associated with the right-hand wheel unit, and thence in a manner similar to that previously described for the left-hand wheel-slip detector 45 and including the contact finger 71 to the brush device 61a, and thereafter by way of the wire 102 including the winding *b* of the relay 46 to the negative battery wire 99.

Upon the energization of the windings *a* and *b* of the relay 46 in the manner just described, the front contacts *c* and *d* of the relay are actuated to their respective picked-up or closed positions.

The contact *c* of the relay 46 is effective in its closed position to establish a self-holding circuit for maintaining the winding *a* of the relay 46 energized independently of the contact finger 71 of the corresponding wheel-slip detecting device 45. This self-holding circuit extends from the positive terminal of the battery 95 by way of the positive battery wire 96, a branch wire 104, a wire 105, contact *c* of relay 46, wire 93 including the winding *a* of relay 46 to the negative battery wire 99 and thence through the contacts of pressure switch 34 to the negative terminal of the battery 95.

It will thus be seen that when an application of the brakes is initiated while the wheels are rotating in a direction to cause engagement of the contact finger 71 with the corresponding contact 74 of the several wheel-slip detecting devices 45, the contacts of the relay 46 are actuated to their respective picked-up or closed positions and maintained in such position thereafter independently of the contact finger 71 of the wheel-slip detecting devices as long as the pressure switch 34 remains in its closed position.

Although actuated to its picked-up or closed position, the front contact *d* of the relay 46 is ineffective to produce an immediate result as will be made clear hereinafter.

Assuming that the wheels 11 of the two wheel units shown in Fig. 1 do not slip during the application of the brakes, no further operation of the equipment occurs except in response to variation of the pressure in the control pipe 15 under the control of the operator. Obviously, the operator may graduate the application on or effect a graduated release of the brakes by simply increasing the pressure in the control pipe in steps or decreasing the pressure in the control pipe in steps. It will be apparent that the relay valve device 27 automatically varies the pressure in the brake cylinders 13 and consequently the degree of application of the brakes in accordance with each variation of the pressure in the control pipe 15.

When the car or train comes to a stop the brakes remain applied until such time as the operator desires to again start the car. The operator may then release the brakes by simply restoring the brake valve handle 22 to its brake release position. The pressure in the control pipe 15 is correspondingly reduced to atmospheric pressure by venting fluid under pressure through exhaust port 24 of the brake valve 21, and the relay valve device 27 operates in response to the reduction of the pressure in the control pipe 15 to atmospheric pressure to effect the complete venting of fluid under pressure from the brake cylinders 13 and the consequent release of the brakes.

Let it now be assumed that when an application of the brakes is initiated in the manner previously described, or at any time during a brake application and while the car or train is being brought to a stop, the wheels of either of the wheel units shown in Fig. 1 begin to slip, for example the wheels of the left-hand wheel unit. In such case, the rotative shift of the axle of that wheel unit backwardly with respect to the disk 65 of the corresponding wheel-slip detecting device 45 causes the contact finger 72 to engage its associated contact 75, resulting in the establishment of a circuit for energizing the winding *a* of the relay 47. This circuit extends from the positive terminal of the battery 95 by way of the positive battery wire 96, branch wire 97, brush device 61a to the contact member 73 as previously described, thence by way of the contact 75, contact finger 72, connector 82, collector ring 62, brush device 62a, a wire 107 including the winding a of the relay 47, negative battery wire 99 including the contacts of the pressure switch 34 to the negative terminal of the battery 95.

Upon the energization of the winding a of the relay 47 in the manner just described, the contacts c and d of the relay are actuated to their picked-up or closed positions. The contact c is a self-holding contact and is effective to establish a holding circuit for maintaining the winding a of the relay 47 energized independently of the contact finger 72 and its associated contact 75 of the wheel-slip detecting device 45 associated with the slipping wheel unit. This holding circuit extends from the positive terminal of the battery 95 by way of the positive battery wire 96, branch wire 104, wire 105, contact c of relay 47, wire 107 including the winding a of relay 47, and negative battery wire 99 including the contacts of the pressure switch 34 to the negative terminal of the battery 95.

Bearing in mind that the relay 46 is being maintained picked-up by a holding circuit including the self-holding contact c thereof, it will be seen that the actuation of the contact d of relay 47 to its picked-up or closed position establishes a circuit for energizing the magnet winding 42 of the magnet valve device 28. This circuit extends from the positive terminal of the battery 95 by way of the positive battery wire 96, a branch wire 109, magnet winding 42 of the magnet valve device 28, a wire 111 including the contact d of relay 47 and the contact d of relay 46 in series relation therein, and wire 99 directly to the negative terminal of the battery 95. Thus, as long as the contacts of both relays 46 and 47 are simultaneously actuated to their picked-up positions, the magnet winding 42 of the magnet valve device 28 is energized.

Upon energization of the magnet winding 42 of the magnet valve device 28, communication from control pipe 15 through the branch pipe 29 to the control chamber of the relay valve device 27 is closed due to the shifting of the double beat valve 39 to its lower seated position and, at the same time, the section of the pipe connected directly to the relay valve device 27 is vented to atmosphere through the exhaust port 44 of the magnet valve device 28. The relay valve device 27 is accordingly operated in response to the rapid reduction of the pressure in the control chamber thereof to vent fluid under pressure at a corresponding rate from the brake cylinders 13 through an exhaust port (not visible) at the relay valve device 27.

The wheels 11 of the slipping wheel unit cease to decelerate because of the instantaneous and rapid reduction in the degree of application of the brakes on the wheel unit and begin to accelerate back toward a speed corresponding to car speed. The total time elapsing between the instant that the wheels begin to slip and the instant they return fully to a speed corresponding to a car speed will vary depending upon the rapidity of response of the brakes to the reduction of the pressure in the brake cylinders 13. In the majority of instances, it has been found that the slipping wheels are restored fully to a speed corresponding to car speed prior to the time that the pressure in the brake cylinders is reduced to a low pressure, such as five pounds per square inch, sufficient to cause restoration of the movable contact 36 of the pressure switch 34 to its open position.

It will be apparent, therefore, that when the slipping wheels cease to decelerate and begin to accelerate back toward a speed corresponding to car speed, the pin 69 secured to the axle 12 returns to the right-hand extremity of slot 68 in the disk 65 and again bends the contact finger 71 into engagement with the contact 74 and incidentally causes disengagement of the contact finger 72 from its associated contact 75. However, in view of the holding circuit established by the self-holding contacts c of the two relays 46 and 47 and the contacts of the pressure switch 34, such operation of the contact fingers 72 and 71 is without immediate effect.

As long as the pressure in the brake cylinders 13 remains above five pounds per square inch, the pressure switch 34 continues to maintain the holding circuits for the winding a of the relays 46 and 47. Accordingly the reduction of the pressure in the brake cylinders 13 to below five pounds per square inch is positively assured. This feature of the equipment shown whereby the reduction in the pressure in the brake cylinders below a certain pressure is positively assured in response to the initiation of wheel slipping is, broadly, not my invention.

When the pressure in the brake cylinders 13 is reduced below five pounds per square inch, the movable contact 36 of the pressure switch 34 is restored to its open position interrupting the holding circuit for the winding a of each of the relays 46 and 47.

Upon the deenergization of the winding a thereof, the relay 47 is restored to its dropped-out position. The restoration of the contact d of relay 47 to its open position interrupts the circuit, previously traced, for energizing the magnet winding 42 of the magnet valve device 28. The valve 39 of the magnet valve device 28 is thus instantly restored to its upper seated position in which it closes the exhaust communication for the control chamber of the relay valve device 27 and restores the supply communication thereto through the branch pipe 29 from the control pipe 15.

The volume of the pipe 29 and the control chamber of the relay valve device 27 is relatively small but the resupply of fluid under pressure to the control chamber tends to cause a reduction of the pressure in the control pipe 15. Due to the pressure-maintaining feature of the brake valve 21, fluid under pressure sufficient to maintain a pressure in the control pipe corresponding to the position of the brake valve handle 22 is supplied to the control pipe automatically. Thus, upon the deenergization of the magnet winding 42 of the magnet valve 28, the control chamber of the relay valve device 27 is again charged with fluid at a pressure corresponding to that in the control pipe 15 which in turn corresponds to the position of the brake valve handle 22. The relay valve device 27 again operates in response to the increase of pressure in the control chamber thereof to resupply fluid under pressure from the supply pipe 14 to the brake cylinders 13 to cause reapplication of the brakes on the wheel truck having the slipping wheels.

The relay 46 does not drop-out in response to the opening of the pressure switch 34 for the reason that, as previously pointed out, the contact finger 71 of the wheel-slip detecting device 45 of the slipping wheel unit has previously been restored into engagement with its associated contact 74 when the slipping wheels began to accelerate back toward a speed corresponding to car speed. Thus, although the holding circuit for relay 46, including its own self-holding contact c and the pressure switch 34, is interrupted, the previously described circuit for initially energizing the winding a of the relay 46 by way of the contact finger 71 and its associated contact 74 of the wheel-slip detecting device 45 is maintained. The relay 46 does not drop-out, therefore, in response to the opening of the pressure switch 34.

When fluid under pressure is resupplied to the brake cylinders 13 in response to the deenergization of the magnet winding 42 of the magnet valve 28 following restoration of the slipping wheels to a speed corresponding to car speed, the movable contact 36 of pressure switch 34 is again restored to its closed position due to the increase of the pressure in the brake cylinders to above five pounds per square inch. The previously described holding circuit for the winding a of the relay 46, including the self-holding contact c, is thereby again established.

If the wheels again begin to slip upon restoration of the brake application, relay 47 is again picked-up and the magnet winding 42 of the magnet valve device 28 thereby again energized to effect the instantaneous and rapid reduction of the pressure in the brake cylinders, after which fluid under pressure is again restored to the brake cylinders following the return of the slipping wheels to a speed corresponding to car speed. It may thus happen that one or more cycles of automatic brake release and brake reapplication may occur during an application of the brakes in bringing the car or train to a stop, depending upon the number of times the associated wheels begin to slip. At no time, however, are any of the wheels permitted to decelerate to a locked condition and slide.

In the previously described operation, slipping of the wheels 11 of the left-hand wheel unit was assumed. In the event that slipping of the wheels 11 of the right-hand wheel unit occurs, the same operation results, that is, relay 47 is picked-up to cause energization of the magnet winding 42 of the magnet valve 28. The only difference in the operation is that the initial pick-up of relay 47 is effected in response to the energization of lower winding b thereof instead of by energization of upper winding a. The circuit for energizing winding b extends from the positive terminal of the battery 95 by way of the positive battery wire 96, branch wire 131, brush device 61a of the wheel-slip detecting device 45 associated with the right-hand wheel unit of Fig. 1, thence by way of collector ring 63 to the contact member 73 on the disk 65 as previously described, contact 75, contact finger 72, brush device 62a, a wire 112 including the winding b of relay 47, and wire 99 including the contacts of pressure switch 34 to the negative terminal of the battery 95. Once the relay 47 is picked-up in response to the energization of the winding b thereof, the self-holding contact c of this relay establishes the previously described holding circuit for energizing the winding a of the relay.

In the event that the wheels of both wheel units of a wheel truck slip simultaneously, the relay 47 is initially picked-up in response to the simultaneous energization of both its windings a and b, the winding a being maintained energized thereafter by the holding circuit, previously described, including the self-holding contact c of the relay.

In the above described operation of the brakes under the control of the wheel-slip detecting devices 45, it was assumed that the car was traveling in a forward direction corresponding to the clockwise direction of rotation of the axle and of the disk 65 as seen in Fig. 3.

If the car is traveling in a reverse direction so that the axle 12 and disk 65 in Fig. 3 rotate in a counterclockwise direction, the sequence of operation of the contact fingers 71 and 72 is reversed, that is, the contact finger 72 is normally shifted into contact with its associated contact 75 due to the fact that the pin 69 in the axle 12 shifts to the left-hand extremity of slot 68 in disk 65 in order to drive the disk 65.

It will be apparent upon analysis that the relay 47 is thus normally picked-up and stuck-up by the holding circuit including the self-holding contact c thereof and that the relay 46 is picked-up only in response to the slipping of the wheels and the consequent momentary engagement of the contact finger 71 with its associated contacts 74 due to the movement of pin 69 in the slot 68 of disk to its right-hand extremity.

It should be thus understood without further description that the equipment operates to cause automatic reduction of the pressure in the brake cylinders and restoration of the pressure therein no matter in which direction the wheels happen to be rotating at the time slipping occurs.

When the car or train comes to a complete stop in response to the application of the brakes during which slipping of the wheels occurs, the fluid pressure is always restored to the brake cylinders to a degree corresponding to the position of the pressure established in the control pipe 15 for the reason that one or the other of the relays 46 or 47 is always restored to its dropped-out position following the opening of the pressure switch 34 in response to the automatic reduction of the pressure in the brake cylinders 13.

With the car or train in a stopped position, the tension in one or the other of the contact fingers 71 is effective to cause shifting of the disk 65 with respect to the axle 12 with which it is associated in a manner to effect separation of both contact fingers 71 and 72 from their associated contacts 74 and 75. Such fact, however, does not result in the drop-out of both of the relays 46 and 47 because of the holding circuit which is maintained for one or the other of the relays as long as pressure remains in the brake cylinders 13 sufficient to maintain the pressure switch 34 closed.

When the operator of the train desires to again proceed after bringing the car to a stop, he first releases the brakes by restoring the brake valve handle 22 to its brake release position to effect the complete venting of fluid under pressure from the brake cylinders 13 and the consequent release of the brakes. In such case, the movable contact 36 of the pressure switch 34 is restored to its open position and thereby interrupts the holding circuit maintained for either of the relays 46 and 47. It will thus be seen that, normally, when the car or train is traveling under power with the brakes released, both the relays 46 and 47 are dropped-out. Thus no energy is taken from the battery 95 by the relays 46 and 47 except during the application of the brakes.

Adaptation of equipment to a train of cars

As previously stated, the equipment shown in Fig. 1 controls the brakes associated with the wheels of a single wheel truck. It will be apparent, however, that in the case of a train of cars, the equipment shown in Fig. 1 may be duplicated for each wheel truck. Thus the brakes throughout the train may be operated under the control of the operator in the same manner as described for the single wheel truck. At the same time, the wheel-slip detecting equipment associated with each wheel truck operates as an individual unit to automatically control the brakes associated with the wheels of the corresponding truck and does not affect the brakes associated with other wheel trucks. Thus, when slipping of the wheels on a particular wheel truck occurs, only the brakes associated with that particular wheel truck are automatically released, the brakes associated with the wheels of other wheel trucks not having slipping wheels not being affected.

Summary

Summarizing, it will be seen that I have disclosed a novel device for registering the rate of change of speed of a rotary element and adapted to detect the slipping of vehicle wheels. The device is also inherently adapted to detect the direction of rotation of the rotary element. It will also be seen that I have provided, in association with the wheel-slip detecting device, control apparatus whereby to effect the instantaneous and rapid reduction in the degree of application of the brakes associated with a vehicle wheel when the wheel begins to slip, such apparatus being effective automatically for either direction of rotation of the vehicle wheels.

While I have shown and described a specific embodiment of my invention, various omissions, additions, or modifications will suggest themselves to those skilled in the art, without involving a departure from the spirit of my invention. It is accordingly not my intention to limit the scope of my invention except in accordance with the terms of the appended claims.

Having now described my invention, what I claim as new and desire to secure by Letters Patent, is:

1. Control apparatus for the brakes associated with the wheels of a vehicle, of the type including means under the control of the operator for effecting application and release of the brakes, comprising in combination, a pair of electrical relays, means associated with a wheel of the vehicle and effective during a brake application to cause continued pick-up of only a certain one of said relays as long as the wheel does not slip and pick-up of both of said relays only in response to a slipping condition of the wheel, and means controlled jointly by said pair of relays and effective to cause a continued reduction in the degree of application of the brakes independently of the operator of the vehicle so long as both of said relays are picked-up simultaneously.

2. In a vehicle brake system of the type having means under the control of the operator for effecting application and release of the brakes associated with the wheels of the vehicle, the combination of a pair of electrical relays, means responsive to the direction of rotation of a wheel of the vehicle and effective during a brake application for causing pick-up of the one or the other of said relays depending upon the direction of rotation of the wheel, means responsive to the slipping of the wheel due to application of the brakes for effecting pick-up of the normally non-picked-up relay, and means controlled jointly by said pair of relays and effective only when both relays are simultaneously picked-up for effecting a reduction in the degree of application of the brakes associated with the wheel independently of the operator.

3. In a fluid pressure brake system for the wheels of a vehicle, of the type having a brake cylinder to which fluid under pressure is supplied to effect application of the brakes and from which fluid under pressure is released to effect release of the brakes and means under the control of the operator for causing fluid under pressure to be supplied to and released from said brake cylinder, the combination of a pair of electrical relays, means responsive to the rotative condition of a wheel of the vehicle for causing only a certain one of said relays to be continuously picked-up during a brake application as long as the wheel does not slip and effective to cause both of said relays to be simultaneously picked-up during a brake application whenever the wheel slips, and means controlled jointly by said pair of relays and effective when both said relays are simultaneously picked-up for causing fluid under pressure to be released from the brake cylinder to effect a reduction in the degree of application of the brakes associated with the slipping wheel, independently of the operator of the vehicle, to prevent sliding of the wheel.

4. In a vehicle brake system of the type having means under the control of the operator for effecting application and release of the brakes associated with the wheels of the vehicle, the combination of a pair of electrical relays, a rotary member, means providing a driving connection between a wheel of the vehicle and said rotary member and adapted to permit a limited degree of rotative movement of the rotary member with respect to the wheel, braking means for constantly exerting a braking effect on the rotary member to cause said rotary member to shift to one extremity of movement thereof with respect to said wheel when the wheel drives the rotary member and effective to cause rotative deceleration of the rotary member at least at a certain rate whereby, when the wheel rotatively decelerates at a rate in excess of the rate of deceleration of the rotary member, the rotary member shifts rotatively to the opposite extremity of movement thereof with respect to the rotary element, means effective when the rotary member is in its one extremity of movement with respect to the said wheel to cause pick-up of one of said relays, means for maintaining said relay picked-up independently of the last said means as long as the application of the brakes exceeds a certain degree, means effective when the rotary member is in its opposite extremity of movement with respect to the wheel for causing the other of said relays to be picked-up, means for maintaining said other relay picked-up thereafter independently of the position of the rotary member with respect to said wheel as long as the application of the brakes exceeds a certain degree, and means controlled jointly by said relays and effective only while both of said relays are simultaneously picked-up for effecting a continued reduction in the degree of application of the brakes associated with the said wheel.

5. In a fluid pressure operated brake system for the wheels of a vehicle, of the type having a brake cylinder to which fluid under pressure is supplied and from which fluid under pressure is released under the control of the operator for effecting application and release respectively of the brakes associated with one or more wheels of the vehicle, the combination of a pair of electrical relays each of which has an operating winding effective upon energization to cause pick-up of the relays, a pressure-operated switch device operated from an open to a closed position whenever the pressure in the brake cylinder exceeds a certain pressure and restored to its open position whenever the pressure in the brake cylinder reduces below said certain pressure, means responsive to the rotative condition of a wheel of the vehicle and including two switches one of which is closed as long as the wheel rotates and does not slip and the other of which is closed only while the wheel rotatively decelerates at a slipping rate, said pressure-operated switch device and said one switch of the wheel-condition-responsive means being jointly effective to cause energization of the operating winding of one of said relays during a brake application, means effective upon energization of the operating winding of the said one relay for thereafter maintaining said one winding energized independently of the said one switch of the wheel-condition-responsive means as long as the pressure-operated switch remains in its closed position, said second switch of the wheel-condition-responsive means and said pressure-operated switch being jointly effective to cause energization of the operating winding of the said second relay during a brake application, means for maintaining the operating winding of said second relay energized independently of said second switch of the wheel-condition-responsive means as long as the said pressure-operated switch is in its closed position, and means controlled jointly by said pair of relays and effective as long as both of said relays are picked-up to cause fluid under pressure to be vented from the brake cylinder to effect a continued reduction in the degree of application of the brakes associated with the slipping wheel, said pressure operated switch being effective when the pressure in the brake cylinder reduces below said certain pressure in response to the operation of the last said means to effect deenergization of the operating winding of said second relay whereby the last said means is restored to its condition for causing fluid under pressure to be resupplied to the brake cylinders.

6. In a vehicle brake system, of the type having means under the control of the operator for effecting application and release of the brakes associated with the wheels of the vehicle, the combination of a pair of electrical relays, means responsive to the rotative condition of a wheel of the vehicle and effective during a brake application for selectively causing continuous pick-up of only the one or only the other of said relays depending upon the direction of rotation of the wheel as long as the wheel does not slip and effective whenever the wheel decelerates at a slipping rate for effecting simultaneous pick-up of both of said relays, means controlled jointly by said pair of relays and effective only while both of said relays are simultaneously picked-up to cause a continued reduction in the degree of application of the brakes associated with the slipping wheel, and means including means responsive to the degree of application of the brakes for causing both of said relays to remain picked-up independently of the wheel-condition-responsive means as long as the brake application exceeds a certain degree and effective when the brake application is reduced below said certain degree in response to the operation of the last said means for effecting drop-out of the one or the other of said relays whereby the last said means is restored to the condition for causing reapplication of the brakes on the slipping wheel.

7. In a vehicle brake control system, of the type having means under the control of the operator of the vehicle for effecting application and release of the brakes associated with the wheels of the vehicle, the combination of a plurality of devices each of which is associated respectively with a corresponding vehicle wheel for detecting a slipping condition thereof, a pair of electrical relays one or the other of which is selectively picked-up and maintained picked-up during a brake application depending upon the direction of rotation of the said wheels, either of said wheel-slip detecting devices being individually effective upon deceleration of the corresponding wheels at a slipping rate for effecting pick-up of the normally non-picked-up relay, and means controlled jointly by said pair of relays and effective only when both relays are simultaneously picked-up for effecting a reduction in the degree of application of the brakes independently of the operator.

8. In a vehicle fluid pressure brake system, of the type having a brake cylinder to which fluid under pressure is supplied and from which fluid under pressure is released under control of the operator for effecting application and release respectively of the brakes associated with a plurality of separately rotating wheels of the vehicle, the combination of a pair of electrical relays each of which has two separate operating windings individually effective upon energization to cause pick-up of the relays, a pressure-operated switch device responsive to variation of the pressure in the brake cylinder from one to the other side of a certain pressure, a plurality of devices associated respectively with wheels corresponding thereto for detecting a slipping condition thereof, one of said wheel-slip-detecting devices being effective jointly with the pressure-responsive switch device to cause energization of one of the operating windings of one or the other of said two relays depending upon the direction of rotation of the wheel associated therewith, another of said wheel-slip-responsive devices being effective jointly with the pressure-operated switch device to effect energization of the other operating winding of the one or the other of said two relays depending upon the direction of rotation of the corresponding wheel, means effective jointly with said pressure-responsive switch device in response to energization of either of the windings of either of the relays for thereafter maintaining one of said windings energized as long as the pressure in the brake cylinder exceeds a certain pressure, each of said wheel-slip-detecting devices being effective upon slipping of the corresponding wheel to cause energization of the corresponding winding of one of said relays not normally energized during a brake application, and means controlled jointly by said two relays effective to cause a continued reduction of the pressure in the brake cylinder as long as said relays are simultaneously picked-up.

9. In control apparatus for the brakes associated with the wheels of a vehicle, which control apparatus is of the type having means under the control of the operator for effecting application and release of the brakes, the combination comprising a pair of current-responsive devices, means effective during a brake application and in response to rotation of a wheel unit of the vehicle for causing energization of only one of said current-responsive devices, means responsive to the slipping of the wheel unit due to application of the brakes for effecting energization of the other of said current-responsive devices, said current-responsive devices being jointly effective only when simultaneously energized to effect a reduction in the degree of application of the brakes associated with the wheel independently of the operator.

10. In a vehicle brake system of the type having means under the control of the operator for effecting application and release of the brakes associated with the wheels of the vehicle, the combination comprising a pair of electrical relays, a first switch device, a second switch device, means responsive to rotation of a wheel unit of the vehicle for effecting continuous closure of the said first switch device as long as the wheel unit does not slip, means responsive to the slipping of the wheel unit for effecting closure of the said second switch device only when said wheel unit slips, said first switch device being effective when closed during a brake application to cause pick-up of one of said relays, said second switch device being effective when closed during a brake application to effect pick-up of the other of said relays, means for maintaining said relays picked-up once they are picked-up as long as the brake application exceeds a certain degree, and means controlled jointly by said pair of relays and effective only while both of said relays are simultaneously picked-up for effecting a continued reduction in the degree of application of the brakes associated with the wheel unit independently of the operator to below said certain degree.

11. In a fluid pressure brake system for vehicles of the railway car type having a brake cylinder to which fluid under pressure is supplied and from which fluid under pressure is released under the control of the operator for effecting application and release respectively of the brakes associated with a wheel unit, the combination comprising a pair of electrical relays, a first switch device, a second switch device, a third switch device operated to a closed position only so long as the pressure in the brake cylinder exceeds a certain value, means responsive to the rotation of the wheel unit for effecting closure of said first switch device as long as the wheel unit does not slip, means for effecting closure of the said second switch device only when the wheel slips, said first switch device and said third switch device being effective when both are closed to cause pick-up of one of said relays, said second switch and said third switch device being effective when both are closed to cause pick-up of the other of said relays, means for maintaining said relays picked-up independently of the said first or second switch device corresponding thereto once the relays are picked-up, means under the joint control of said relays and effective only when said relays are both simultaneously picked-up for effecting a continued reduction of the pressure in the brake cylinder, said third switch device being effective upon a reduction of pressure in the brake cylinder below said certain value for rendering the relay pick-up maintaining means ineffective whereby to cause operation of the last said means to effect the resupply of fluid under pressure to the brake cylinder and a consequent reapplication of the brakes.

CLAUDE M. HINES.